(12) United States Patent
Hopkins

(10) Patent No.: US 6,278,371 B1
(45) Date of Patent: Aug. 21, 2001

(54) ABSORBENT PADS HAVING THEFT ALARM ACTIVATORS THEREIN

(75) Inventor: William G. Hopkins, Laguna Hills, CA (US)

(73) Assignee: Paper-Pak Products, Inc., La Verne, CA (US)

(*) Notice: Subject to any disclaimer, the term of this patent is extended or adjusted under 35 U.S.C. 154(b) by 0 days.

(21) Appl. No.: 09/582,469
(22) PCT Filed: Apr. 26, 2000
(86) PCT No.: PCT/US00/11343
 § 371 Date: Jun. 27, 2000
 § 102(e) Date: Jun. 27, 2000
(87) PCT Pub. No.: WO00/66352
 PCT Pub. Date: Nov. 9, 2000

Related U.S. Application Data
(60) Provisional application No. 60/132,131, filed on Apr. 30, 1999.

(51) Int. Cl.[7] .................................................. G08B 23/00
(52) U.S. Cl. ............................... 340/573.1; 340/572.8; 340/568.1
(58) Field of Search ............................. 340/573.1, 571, 340/572.1, 572.3, 572.5, 572.8, 572.9, 568.1, 539, 10.3, 605, 604; 206/204; 428/137, 138, 132

(56) References Cited

U.S. PATENT DOCUMENTS

| | | |
|---|---|---|
| 4,510,489 | 4/1985 | Anderson, III et al. |
| 5,079,541 * | 1/1992 | Moody ............................. 340/572.1 |
| 5,320,895 * | 6/1994 | Larsonneur et al. .............. 428/137 |
| 5,428,346 | 6/1995 | Franklin . |

* cited by examiner

Primary Examiner—Daniel J. Wu
Assistant Examiner—Anh La
(74) Attorney, Agent, or Firm—Henry M. Bissell

(57) ABSTRACT

Absorbent pads with theft alarm activator elements concealed from view within each individual pad. These pads are designed for inclusion in a tray with a meat, fish or poultry product. The alarm activator element in each pad may be a strip or wire of magnetic material of suitable magnetic retentivity. In an alternative arrangement, a resonator may be used in conjunction with a magnetic strip which controls its resonant frequency. In the case of meat or poultry product pads, the element is cored into the pad between pluralities of laminated layers of tissue, cellulose, airlaid or composite. The element may be positioned between adjacent pairs of laminated tissues in a composite pad.

20 Claims, 2 Drawing Sheets

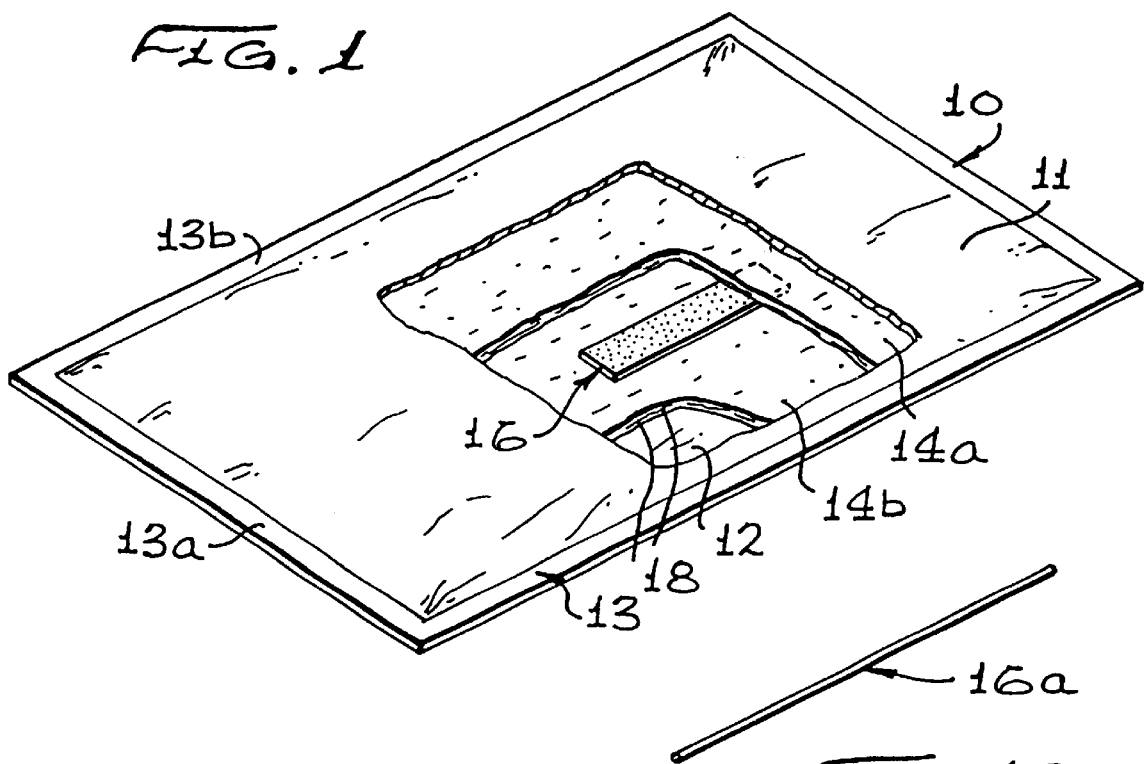
FIG. 1
FIG. 1A
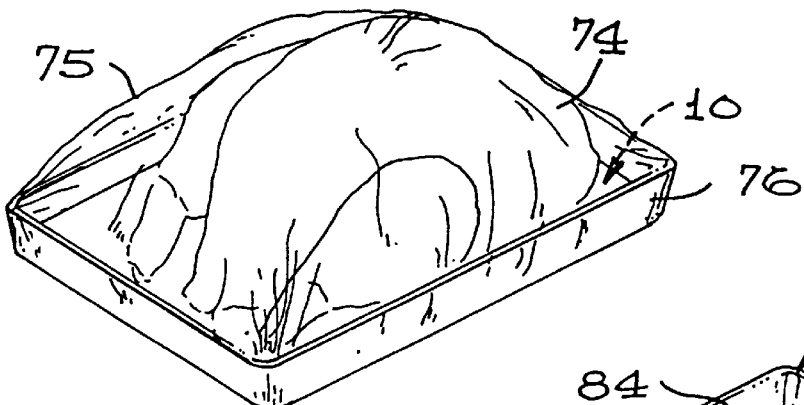
FIG. 1B
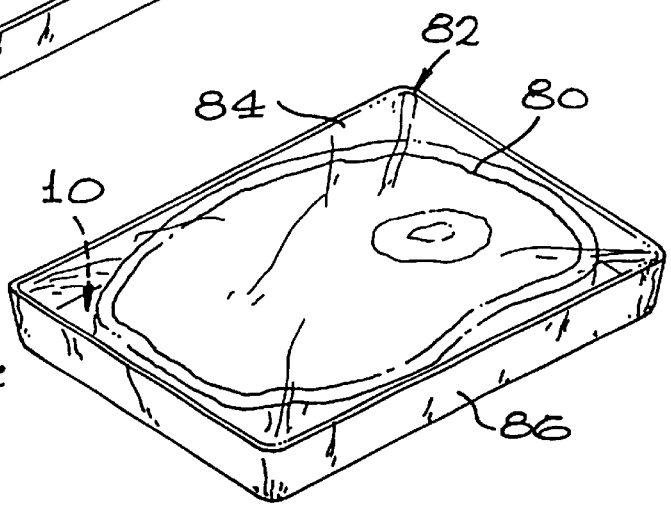
FIG. 1C

ABSORBENT PADS HAVING THEFT ALARM ACTIVATORS THEREIN

This application is a 371 of PCT/US 00/11343 filed Apr. 26, 2000 which claims benefit of 60/132,131 filed on Apr. 30, 1999.

BACKGROUND OF THE INVENTION

This invention relates to absorbent pads fabricated of laminated layers of absorbent tissue and, more particularly, to such pads which contain theft alarm activators therein.

Absorbent pads particularly designed for packaging with meat, poultry and fish food products are used in food markets, poultry processing plants and the like to reduce product display costs and to provide a cleaner, more attractive product. These pads are generally wrapped with the food product on the underside thereof to absorb liquids which may "bleed" from the product. In poultry products, for example, it is customary to place the poultry parts of a given package in a molded shallow tray of foamed plastic or the like. One of these absorbent pads is placed in the bottom of the tray and the poultry parts are placed thereon. The complete package is then wrapped with clear polyethylene or the like.

Packaged meat products sold in retail establishments, such as meat markets and supermarkets, may have a significant monetary value. Typically, such products will have a price of several dollars or even a dollar value in double digits. This level of value is such that shoplifting begins to become a serious problem. At the same time, it begins to be worthwhile for the marketing establishment to incur the additional expense of theft detection systems in order to prevent or deter shoplifting.

Typically, such systems work with products including an alarm activator element (a "tag"), a device for deactivating the element at the point of sale, such as a checkout counter, and a sensor at a point where people exiting the establishment must pass by. In one such system, the activator element is a small strip or wire of magnetic material which is initially magnetized as a permanent magnet. In conjunction with such a system, there is a device at the checkout counter for generating a demagnetizing field. If the activator element or "tag" is not demagnetized, it activates the theft alarm when the person carrying the product passes by the sensor.

Another theft detection system, similar in concept but using a somewhat different tag and means and method for deactivating the tag, is also known in the art. This utilizes tags (alarm activator elements) based on "acoustomagnetic" principles. The system operates at a carefully chosen narrow band of low radio frequencies, for example 58 kilohertz (kHz). The selected frequencies minimize any interference from other electronics.

In this system, the tag contains a resonator made of an amorphous magnetic material of a precise length and thickness, which is excited by low-frequency radio signals generated by a transmitter at the store's entrance/exit. The resonator vibrates at the same frequency, thus transmitting an identical signal. A receiver which is also positioned at the entrance/exit detects the resonator's signal and initiates an alarm.

One of the benefits of this acoustomagnetic detection system is that the low-frequency radio signals from the transmitter can penetrate foil shielding which might be used by a would-be shoplifter to defeat other types of detector units.

One particular theft detection system, based on acoustomagnetic principles, provides a transmitter unit mounted at a pedestal adjacent a store entrance or checkout aisle. This unit transmits 58 kilohertz low-radio-frequency pulses (referred to as "blue pulses") at 11-millisecond intervals. A resonator positioned inside an absorbent pad of the present invention, when passing through the pedestal, begins to vibrate at 58 kilohertz, identical to the transmitted frequency, thereby sending "red pulses". A receiver, also installed at the pedestal, is turned on during the 11-millisecond interval between the blue pulses so that it can pick up the red pulses emitted by the tag installed in the product in response to the transmission of the blue pulses. If the receiver receives a signal at least four times, it sets off an alarm.

The tag contains a magnetized strip adjacent to the resonator which insures that the oscillations of the resonator remain precisely at 58 kilohertz. A scanning device at the checkout counter can turn off the tag when the merchandise is sold by demagnetizing the strip or by altering its magnetic properties. At that point the resonator either does not vibrate (does not emit red pulses) or it resonates at the wrong frequency so that its pulses are not recognized by the receiver.

U.S. Pat. No. 5,320,895 of Lionel M. Larsonneur and Stanley E. Schilcher discloses an absorbent pad for use with meat and poultry products in retail sale packages. The disclosure of that patent is incorporated herein by reference as though set out in haec verba. It has a laminated tissue absorbent mat sandwiched between upper and lower plastic sheets. During production of the pad, aligned channels are established through the pad from top to bottom by the penetration of a series of perforating pins.

In the case of absorbent pads having theft alarm activator elements which are used with meat and poultry products, the packaging is such that the pad is usually visible, at least in major extent, at the underside of the product within its transparent wrapping. For pads such as are known in the prior art having an alarm activator element, the element is generally readily apparent to a discerning shoplifter because it is positioned along the upper exterior surface of the pad. It would be preferable for such an absorbent pad to have its theft alarm activator element out of sight within the pad, such as between the tissue layers of an absorbent pad constructed of tissue layer laminations. Other materials suitable for the laminated layers are cellulose, airlaid and composites.

SUMMARY OF THE INVENTION

In brief, particular arrangements in accordance with the present invention involve absorbent pads in which the absorbent core of the pad is constructed preferably of a plurality of tissue layers. These core pads are constructed of multiple tissue laminations and include an alarm activator element which is "cored into" the pad. This configuration is only feasible with laminated tissue pads or with composite pads of tissue laminations because of the ability of the laminated tissue construction to hold the alarm activator element in place without it migrating about in the pad. Placement of the alarm activator element within the tissue pad core in this fashion ensures that it is not apparent by inspection from outside the wrapped product. Thus, an unsuspecting shoplifter has no idea that what he is attempting to remove from the sales establishment contains. an alarm activator until the alarm sounds as he passes by the activator sensor near the exit of the establishment. In addition to theft detection, publication of the use of alarm activators is an effective theft deterrent.

In accordance with a further aspect of the invention, another particular arrangement comprises a composite of layered tissue pads with an alarm activator element positioned between a pair of such pads. This permits the inclusion of such an element within a composite absorbent pad containing individual layered pads fabricated in accordance with the teaching of the above-referenced Larsonneur-Schilcher patent. The overall composite product actually incorporates two pads fabricated in accordance with the teaching of the Larsonneur-Schilcher patent between which an individual alarm activator element is placed. A single perforated pad prepared as disclosed in that patent may be fabricated to contain an alarm activator element placed between the rows of perforations, if desired. The product preferably includes an enclosing envelope or shell of plastic or some other suitable material with one or both of the upper and lower layers perforated as may be desired for most effective absorption and retention of liquid within the composite pad. Because of the forces holding the two pads together within the external sealed envelope, migration of the internal alarm activator elements is prevented.

BRIEF DESCRIPTION OF THE DRAWING

In the accompanying drawings:

FIG. 1 is a schematic representation, partially broken away, of a pad of the present invention, showing an alarm activator element positioned between pluralities of tissue layers;

FIG. 1A is a schematic representation of an alternative alarm activator element for the pad of FIG. 1;

FIG. 1B is a view indicating the use of the pad of FIG. 1 in association with a poultry product;

FIG. 1C is a view indicating the use of the pad of FIG. 1 in association with a meat product;

DETAILED DESCRIPTION OF THE PREFERRED EMBODIMENTS

Figure 2:
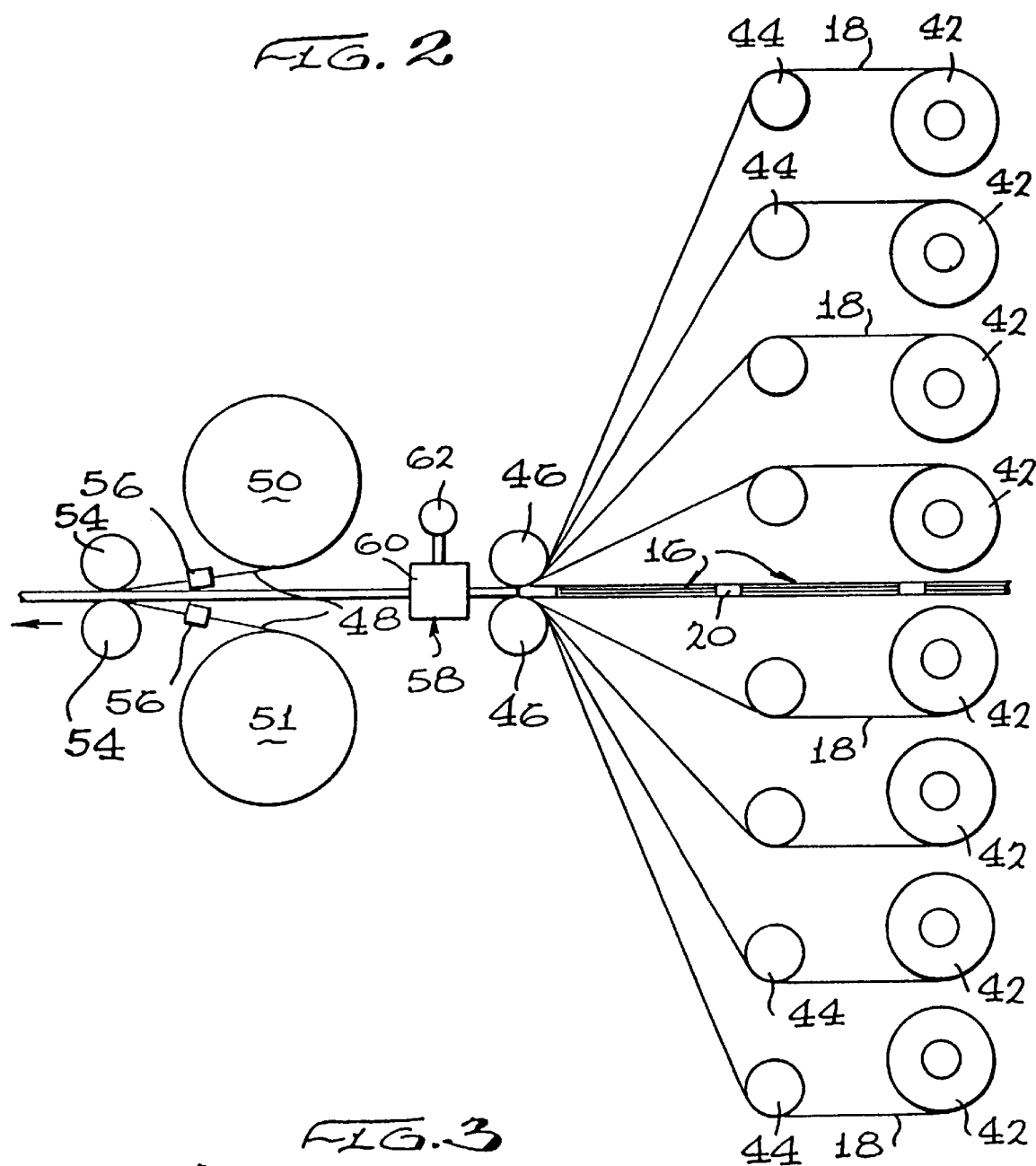
FIG. 2 is a schematic representation of a portion of a production line for producing pads such as that depicted in FIG. 1.

In the schematic representation of FIG. 1, which is intended to show a somewhat "generic" example of different versions of absorbent pads which may be constructed in accordance with the present invention, a pad 10 is shown having an top layer 11 and a bottom layer 12 enclosing a plurality of laminated tissue layers 14a and 14b. The pad 10 is shown with a border 13 comprising longitudinal sections 13b and transverse sections 13a. These borders are typically sealed together, as by pressure, adhesive, ultrasonic bonding or the like, but it will be understood that either or both of the sections 13a and 13b may be absent, depending upon the manner in which the pad 10 is fabricated and the way it may be cut or slit to separate individual pads from a continuous assembly of various layers.

The laminated layers 14a and 14b are shown formed of individual tissue layers 18. It will be understood that the laminations 14a and 14b, as shown, may represent respective individual pads in a composite assembly or, they may simply represent respective pluralities of individual layers 18 of tissue, cellulose, airlaid or composites respectively above and below the element 16.

Element 16 is shown as a strip representing an alarm activator element of a first type known in the art. In one example, the theft alarm activator element 16 is constructed of a magnetic material having retentive magnetic properties so that it may be magnetized to hold a magnetic field. Such element 16 is responsive to a strong demagnetizing field applied in the vicinity of the pad 10 so that it loses its ability to activate an alarm in a system having a sensor which is designed to respond to the presence of the element 16 in the pad 10 in its initial magnetic state. Once deactivated by the demagnetizing field, commonly present at the checkout counter of a retail establishment, the sensor near the exit of the establishment no longer responds to the presence of the element 16 and thus the pad 10, together with whatever product it may be packaged with, may be taken from the establishment without activating the alarm. Other alarm activator elements and systems known in the art, such as the acoustomagnetic tag and system described hereinabove, which perform the equivalent function may be used as the element 16. Although the element 16 is shown aligned longitudinally in the center of the pad 10, it may be aligned in a different orientation (e.g., transversely) and may be displaced from the center so long as it remains enveloped by the tissue layers 14a, 14b so that it is held in position and is not visible outside the pad.

In FIG. 1A, an alternative to the element 16 of FIG. 1 is shown. This element 16a is a magnetic wire of substantially the same material as the magnetic strip 16 of FIG. 1 and it may be used as an alternative alarm activator element, if desired.

FIG. 1B shows a poultry product packaged for sale. As shown in FIG. 1B, a prepared chicken or other fowl product 74 is in place on an absorbent pad 10 within a tray 76. An outer wrapping of suitable thermoplastic film material 75 is positioned over the fowl 74 and heat sealed or otherwise closed beneath the tray 10 in conventional fashion, forming a completed food package. In similar fashion, as shown in FIG. 1C, a corresponding meat package 82 containing a product 80, such as a steak, a roast or other cut of meat, is in position on an absorbent pad 10 within a tray 86. The entire package is wrapped with a suitable transparent plastic wrapping material 84 and sealed on the underside.

FIG. 2 schematically represents portions of a production line for the fabrication of products in accordance with the present invention. This is not intended to show actual details of such a production line, which are known in the art, but merely indicates an understanding of the addition of fabrication steps of the present invention.

In FIG. 2, a plurality of rolls 42 are shown, each providing a single layer of cellulose tissue 18 for a pad such as that shown in FIG. 1. Each layer of tissue 18 is drawn from its corresponding roll 42, over a corresponding idler roll 44, and then, with the other layers 18, between a pair of rolls 46 which may serve to draw the individual lamination layers 18 along the production line. The tissue layers 18 are then stitched together to form a continuous strip of laminated tissue layers at the stitching stage 58 comprising a stitching machine 60 coupled to a control element 62.

From the stitching stage 58, the laminated layers of cellulose tissue move along the production line, as indicated in FIG. 2, to receive the top and bottom layers 48 of polyethylene for the outer plastic layers of the finished pads, drawn from rolls 50 and 51. As the layers 48 proceed from the rolls 50, 51, they pass through perforators 56 which form a plurality of small holes in the plastic layers to admit liquid for absorption into the laminated core of the finished pads. The thus-formed strip of laminated sheet material passes between bonding rolls 54 where the side edges of the top and bottom plastic layers are sealed together by pressure bonding.

Between upper and lower sets of rolls 42 and idler rolls 44 is a plurality of individual activator elements 16 supported between carrier webs 20 for introduction into the laminating line between upper and lower sets of individual tissue layers 18. This arrangement serves to place the individual alarm activator element 16 between the upper and lower pluralities 14a, 14b of tissue layers 18 shown in the finished product 10 of FIG. 1. The spacing between the elements 16 of FIG. 2 is such as to permit appropriately indexed slitting knives and cutters to perform the cutting operations between the elements 16.

Following the fabrication steps described, as represented in FIG. 2, the laminated sheet material is directed to slitting knives and transverse cutters (not shown) to finish producing the pads in the desired dimensions—for example, 4¼×6 ½ inches or any other size which may be desired. The cutting blades lightly adhere the laminations at all edges, forming the borders 13 as shown in FIG. 1.

Figure 3:
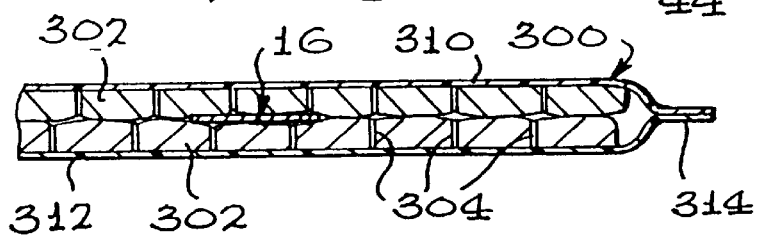
FIG. 3 is a side sectional view of one particular composite pad in accordance with the present invention.

FIG. 3 is a side sectional view of a composite pad 300 formed by a pair of individual pads of the above-cited Larsonneur-Schilcher patent 5,320,895. As described in that patent, these individual pads 302 are fabricated by using a perforating wheel on the pad production line which penetrates entirely through the pad at regular intervals to form the channels 304. Two of these pads 302 are then assembled as a composite with a magnetic strip 16 between them. The magnetic strip 16 may be of the permanent magnetic type or of the acoustomagnetic type, both of which are described hereinabove and shown as alternatives in FIGS. 1 and 1A. Finally, this assembly is encased in a shell having a preferably liquid impervious upper layer 310 and a preferably liquid permeable lower layer 312 of polyethylene or some other appropriate plastic with the periphery being sealed as shown at 314. Composite pads as shown in FIG. 3 function in the manner described with respect to the pad of FIG. 1, the alarm activator magnetic strip 16 serving to activate the sensor of a theft alarm system unless it is demagnetized prior to entering the vicinity of the sensor.

Although there have been described hereinabove various specific arrangements of ABSORBENT PADS HAVING THEFT ALARM ACTIVATORS THEREIN in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A device in the form of an absorbent pad for performing the dual function of absorbing liquids which may bleed from animal-derived food items with which the pad is packed and activating a theft alarm during removal of the packaged food item from a building space equipped with a theft detection system, said absorbent pad comprising:

a core including a mat of absorbent material;

an upper sheet and a lower sheet situated on opposite sides of said core, at least one of said sheets being permeable to liquid which may bleed from the associated food item, said sheets having opposite edges which are sealed together to define an envelope encasing said core;

said mat including at least two separate portions, an upper portion adjacent said upper sheet and a lower portion adjacent said lower sheet; and an alarm activator element located between said upper and lower portions, said activator element incorporating a magnetic member which is capable of interacting with a remote detector to activate a theft alarm when said magnetic member is in a first one of two alternative conditions, the juxtaposition of said upper and lower portions and said alarm activator element being such that the alarm activator element is not discernible from outside of the packaged food item.

2. The device of claim 1 wherein said absorbent pad, when packaged with a food item supported on a formed tray, is located on the underside of said food item between the food item and the tray supporting the food item.

3. The device of claim 1 wherein each of said upper and lower portions of said mat comprises a plurality of tissue layers which are laminated together to form said portion.

4. The device of claim 1 wherein each of said upper and lower portions comprises a plurality of laminated cellulose layers.

5. The device of claim 1 wherein each of said upper and lower mat portions comprises a plurality of laminated air laid layers.

6. The device of claim 1 wherein each of said upper and lower mat portions comprises a plurality of laminated composite layers.

7. The device of claim 1 wherein said upper and lower mat portions are perforated to form channels extending through said mat portions to enhance the liquid absorbtivity of said core.

8. The device of claim 1 wherein said magnetic member comprises a strip of magnetic material capable of retaining a magnetic state as a permanent magnet.

9. The device of claim 1 wherein said magnetic member comprises a wire of magnetic material capable of retaining a magnetic state as a permanent magnet.

10. The device of claim 8 wherein said magnetic member is capable of demagnetization to a second one of said two alternative conditions in response to demagnetizing field apparatus selectively operated in preparation for authorized removal of said packaged food item from said space.

11. The device of claim 9 wherein said magnetic member is capable of demagnetization to a second one of said two alternative conditions in response to demagnetizing field apparatus selectively operated in preparation for authorized removal of said packaged food item from said space.

12. The device of claim 1 wherein said magnetic member includes a resonator of amorphous magnetic material of selected length and thickness capable of excitation by low-frequency radio signals received from a transmitter at the point of removal from said building space.

13. The device of claim 12 wherein said radio frequency signal constitutes a series of 58 kHz pulses at 11 millisecond intervals.

14. The device of claim 13 wherein said resonator, in response to said 58 kHz radio frequency pulses, resonates at the same frequency to emit a series of delayed pulses.

15. The device of claim 14 wherein said magnetic member further includes a magnetic strip adjacent said resonator to control the resonator oscillations.

16. The device of claim 15 wherein said magnetic strip adjacent said resonator is effective to maintain said resonator oscillations at said 58 kHz frequency.

17. The device of claim 16 wherein said magnetized strip is demagnetizable from a point adjacent the exit of said building space to make any resonator oscillations undetectable at said exit point.

18. The device of claim 1 comprising a pair of absorbent pads fabricated in a sandwich configuration with an alarm activator element positioned between said pads, said pads and said activator element being enclosed in a perforated envelope.

19. A device in the form of an absorbent pad for packaging with a retail-sale animal-derived food item to absorb liquids which may bleed from said food item, said pad being fabricated to contain a member capable of interacting with apparatus adjacent a building space in which the food item has been stored to activate a theft alarm situated adjacent the point of departure from said building space, said absorbent pad comprising:

a core including a mat of absorbent material;

an upper sheet and a lower sheet situated on opposite sides of said core, at least one of said sheets being permeable to liquid which may bleed from the associated food item, said sheets having opposite edges which are sealed together to define an envelope encasing said core;

said mat including at least two separate portions, an upper portion adjacent said upper sheet and a lower portion adjacent said lower sheet; and an alarm activator element located between said upper and lower portions, said activator element incorporating a magnetic member which is capable of interacting with a remote detector to activate a theft alarm when said magnetic member is in a first one of two alternative conditions, the juxtaposition of said upper and lower portions and said alarm activator element being such that the alarm activator element is not discernible from outside of the packaged food item.

20. The device of claim 19 wherein said magnetic member is capable of being shifted to a second alternative condition in preparation for authorized removal of said packaged food item from said building space, wherein said magnetic member in said second condition does not activate said theft alarm.

* * * * *